Aug. 20, 1940.　　　H. G. HOLMES　　　2,211,779
DYNAMIC WHEEL BALANCING DEVICE
Original Filed June 4, 1936　　　3 Sheets—Sheet 1

Inventor
HERBERT G. HOLMES

Patented Aug. 20, 1940

2,211,779

UNITED STATES PATENT OFFICE 2,211,779

DYNAMIC WHEEL BALANCING DEVICE

Herbert Glenn Holmes, Lansing, Mich., assignor to Food Machinery Corporation, San Jose, Calif., a corporation of Delaware Application June 4, 1936, Serial No. 83,587
Renewed May 24, 1939

27 Claims. (Cl. 73—53)

This invention relates to a device for testing the dynamic balance of wheels in general and is particularly adapted to the testing of automobile wheels with tires mounted thereon.

Automobile wheels that are not balanced dynamically have considerable side wobble at high speeds and tend to render driving unsafe and subject the car chassis and wheel assembly to very serious strains.

The device herein has been designed to test wheels for dynamic balance very quickly and easily and to give visual evidence of the amount of the unbalance by simply reading a suitable scale provided in the construction.

Broadly the device comprises a stand or base having a fixed vertical spindle secured thereto. Mounted on this fixed spindle is a freely rotating quill having an upward extending spindle on which the wheel to be tested is securely mounted through clamping the wheel bearing of the wheel to the quill spindle. The quill extends down around the fixed spindle but is spaced therefrom so it has free rotation and can tilt to a limited extent without touching the fixed spindle.

Mounted on a circular hub carried by the quill is a freely movable plate held by friction so that it can be adjusted on the hub to rotate in any desired plane relative to the wheel, and mounted under the plate, which we may call a detector plate, or wobble plate, is a hand lever carrying two rollers that may be contacted with the detector plate while it is rotating and set its plane of rotation parallel with that of the wheel being tested if it were in balance.

Mounted on the table or stand at one side of the rim of the wheel is a spinning motor that is on a pivoted mounting so that it may be swung into contact with the periphery of a tire to give it a testing speed of rotation around 800 revolutions per minute. When the wheel has reached substantially this speed the motor is swung away from contact with the wheel and it is permitted to continue spinning freely. On account of dynamic unbalance, if any is present, the freely spinning wheel will wobble and at a given instant will assume a plane of rotation in accord with the degree of unbalance present, which will tilt the quill and detector plate carried thereby. If now the hand lever carrying the rollers is lifted so the rollers contact with the under side of the detector plate it will immediately slip on the hub and assume a plane of rotation parallel with the normal plane of rotation of the wheel, that is, perpendicular to the axis about which the wheel is wobbling.

When this adjustment of the detector plate has been made while the wheel and plate are rotating at a comparatively high speed, the wheel may be stopped by hand until it rests in its normal state of balance when not rotating.

On account of the detector plate being adjusted to the wheel when under high rotation and thus rotating in an assumed plane due to the dynamic unbalance present, the plate will now be positioned out of parallel with the wheel and tire when at rest. If the wheel is now rotated slowly by hand the detector plate will wobble more or less according to its adjustment.

Positioned on the fixed spindle is a sleeve carrying an indicator arm and pointer with a scale. After the procedure above described has been passed the arm and pointer are raised up until a movable pin carried by the arm contacts with the wobble or detector plate, the movable pin bearing on the pointer so that it will be slightly depressed. Now if the wheel is slowly rotated the detector plate will rotate with the same amount of wobble which the wheel had and move the contact pin up and down and thereby move the pointer over the fixed scale carried by the arm.

The pointer thus playing over the scale will indicate in degrees to the operator the extent of wobble in the detector plate, and this in turn will indicate to an experienced operator the probable amount of weight to add to the wheel rim to counteract the dynamic unbalance. The positions of the high and low spots of the detector plate in this operation will also indicate the spots on the wheel rim where the weights should be placed.

After compensating weights are placed according to the judgment of the operator the wheel is given another spin with the motor and the balance of the wheel is again checked, and if the weights have been placed substantially in the correct positions the wheel in this second test should run nearly true and show very little unbalance. If it is still dynamically unbalanced additional weights are added or those applied moved around slightly or if they were too heavy light weights substituted. The wheel is tested and weighted and retested until proper dynamic balance is shown when the weights are permanently attached to be a part of the wheel assembly. The positions of the tires relative to some spot or mark on the wheel rim should be noted after the wheel has been balanced so that if the tire is removed it can be replaced in the same relative position on the rim.

Wheels are balanced statically before they are checked for dynamic balance, then when they are dynamically balanced they will run true at all speeds of operation.

It is an object of the invention to provide an apparatus for dynamically balancing automobile and other wheels by rotating them in a horizontal plane and indicating the amount and location of unbalance by a scale and pointer.

It is a further object of the invention to provide an apparatus for dynamically balancing automobile wheels and the like wherein a detector plate is associated with the wheel during its testing to indicate the amount and location of unbalance.

It is a further object of the invention to provide an apparatus for dynamically balancing automobile wheels and the like wherein a detector plate and scale and pointer are associated to indicate by visual means the amount and location of the unbalance.

It is also an object of the invention to provide an apparatus for dynamically balancing wheels and the like by rotating them at high speed and adjusting a detector plate in accordance with the amount of wobble.

It is also an object of the invention to provide an apparatus for testing the dynamic balance of automobile wheels and the like by subjecting the wheels to high rotative speed so they will wobble according to the dynamic unbalance present and then adjusting a detector plate to the plane of rotation about the axis of wobbling so the actual dynamic unbalance may be indicated on a scale.

It is also an object of the invention to provide an apparatus for checking the dynamic balance of automobile wheels and the like wherein a vertical arbor or spindle is fixed and a removable quill is attached to the wheel to be checked and the entire assembly then placed on the fixed arbor and given rotation to detect the dynamic balance.

It is also an object of the invention to provide an apparatus for checking the dynamic balance of automobile wheels and the like wherein a detector device is mounted coincident with the wheel and which has planar adjustment relative thereto to enable the determination of dynamic unbalance.

It is a further object of the invention to provide an apparatus for checking the dynamic balance of automobile wheels and the like having a vertical spindle on which the wheel is mounted for testing and providing a spinning motor for imparting the necessary speed of rotation to a positioned wheel to cause it to wobble because of unbalance and then adjusting a detector plate so that the amount and location of unbalance may be determined from the position of the detector plate.

It is a further object of the invention to provide in a single apparatus for checking the dynamic balance of automobile wheels and the like means and mechanism for rotating a wheel which is free to wobble in response to any unbalance, moving an associated device while the wheel is so wobbling to measure and locate the wobble for future determination and then providing a visual apparatus associated with said last device to give visual indication of the amount and location of unbalance.

With such objects in view as well as other objects and advantages that have been evolved in the development of the apparatus, applicant wishes it understood that changes in the relative arrangement of the operative parts may be made without departing from the nature and scope of the invention and that he considers himself as entitled to any such changes and arrangement of parts as may be made by others. The drawings accompanying the application represent the preferred form of the invention as applied to an operative machine, but applicant wishes it understood that they may not be made to exact scale neither are the several parts and combinations necessarily made in proper relative proportions, the drawings are intended to be illustrative rather than accurate working drawings, they are however, sufficiently accurate to enable anyone skilled in the art to make and use the apparatus.

Reference now being had to the drawings a better and clearer understanding of the invention will be had.

Figure 1:
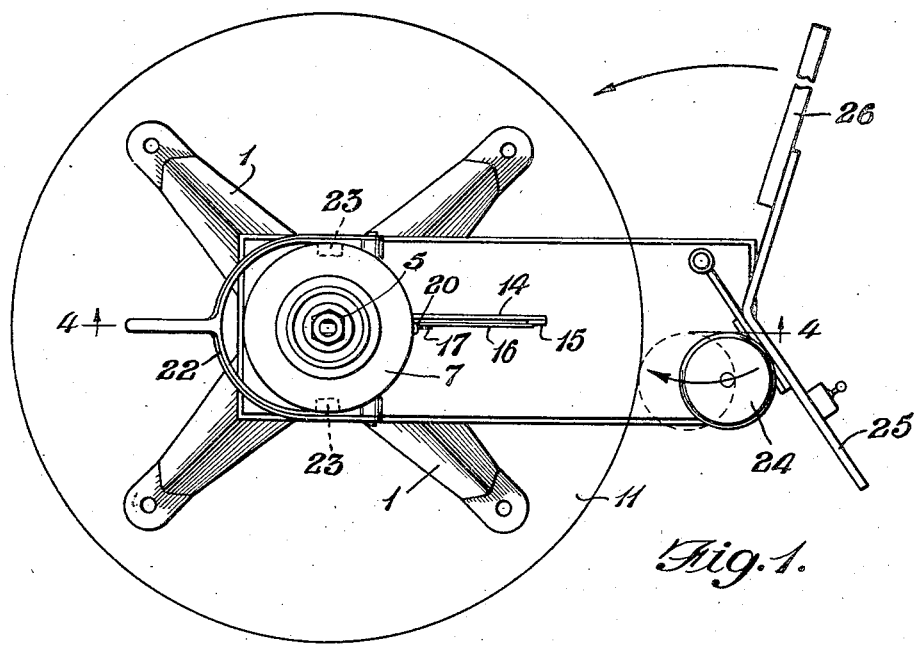
Figure 1 represents a plan of the apparatus with a wheel mounted thereon ready to start a test for dynamic balance.

Referring now to the drawings where like references indicate like parts in the several views the numeral 1 represents a base on which the testing apparatus is mounted. 2 is a fixed vertical spindle or arbor carrying a rotatable quill 3 on which the wheel is mounted for testing, this quill is hollow to rest over the fixed spindle or arbor 2 and has an extension forming a spindle to which the wheel to be tested is secured, and carries cone bearings 4 which receive the ball bearings of the wheel and are tightly clamped therein by the nut 5 so that the wheel and spindle move as one in the test. The quill 3 also carries a ball shaped hub member 6 fixedly secured thereto, and mounted on this ball 6 is a wobble plate 7 frictionally held thereon for free movement by means of a spherical seat 7a and springs 8 resting firmly on the ball member 6. The quill 3 is supported on the arbor 2 by means of the ball bearing assembly 9.

10 represents the wheel center and 11 the tire mounted thereon.

Figure 3:
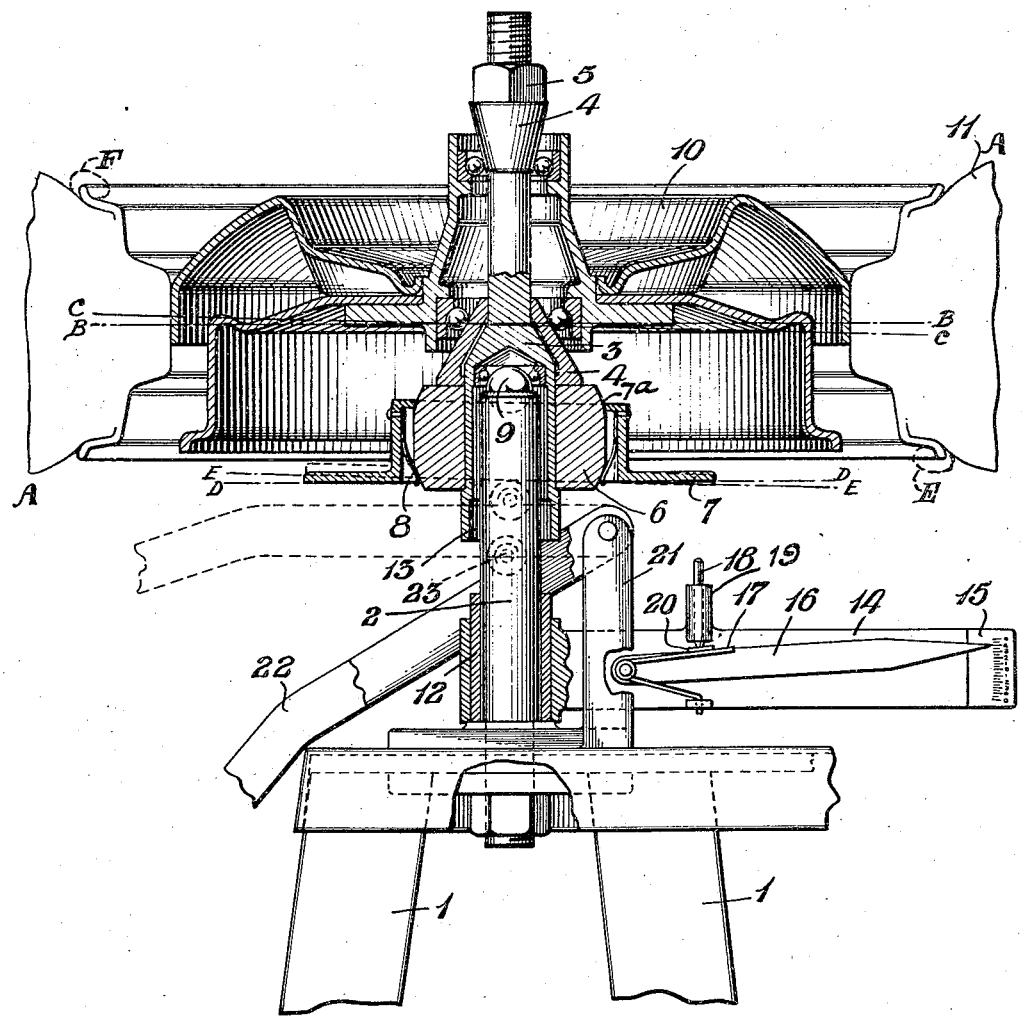
Figure 3 is a vertical sectional elevation on an enlarged scale taken on substantially the line 4—4 of Figure 1 looking in the direction of the arrow, said view illustrating the position of the parts before a test for dynamic balance is carried out.

Located on the lower portion of the fixed arbor 2 is a sleeve member 12 slidable vertically on the arbor and proportioned to enter the recess 13 in the lower end of the quill 3 and thus serve to center the quill to the arbor in which position the wheel would rotate in what we will call a normal plane, indicated by the horizontal line B—B in Fig. 3, which would be the position it would rotate in if it were in perfect dynamic balance.

Figure 2:
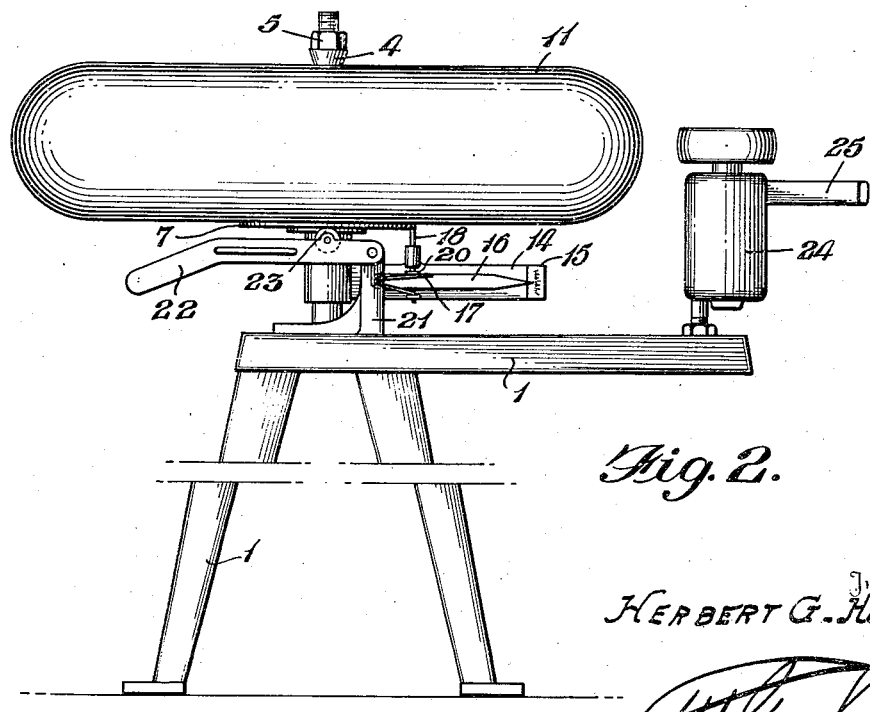
Figure 2 is a side elevation of Figure 1 illustrating the hand lever and indicating mechanism in their elevated positions for cooperation with the detector disc, which is shown in level position.
Figure 4:
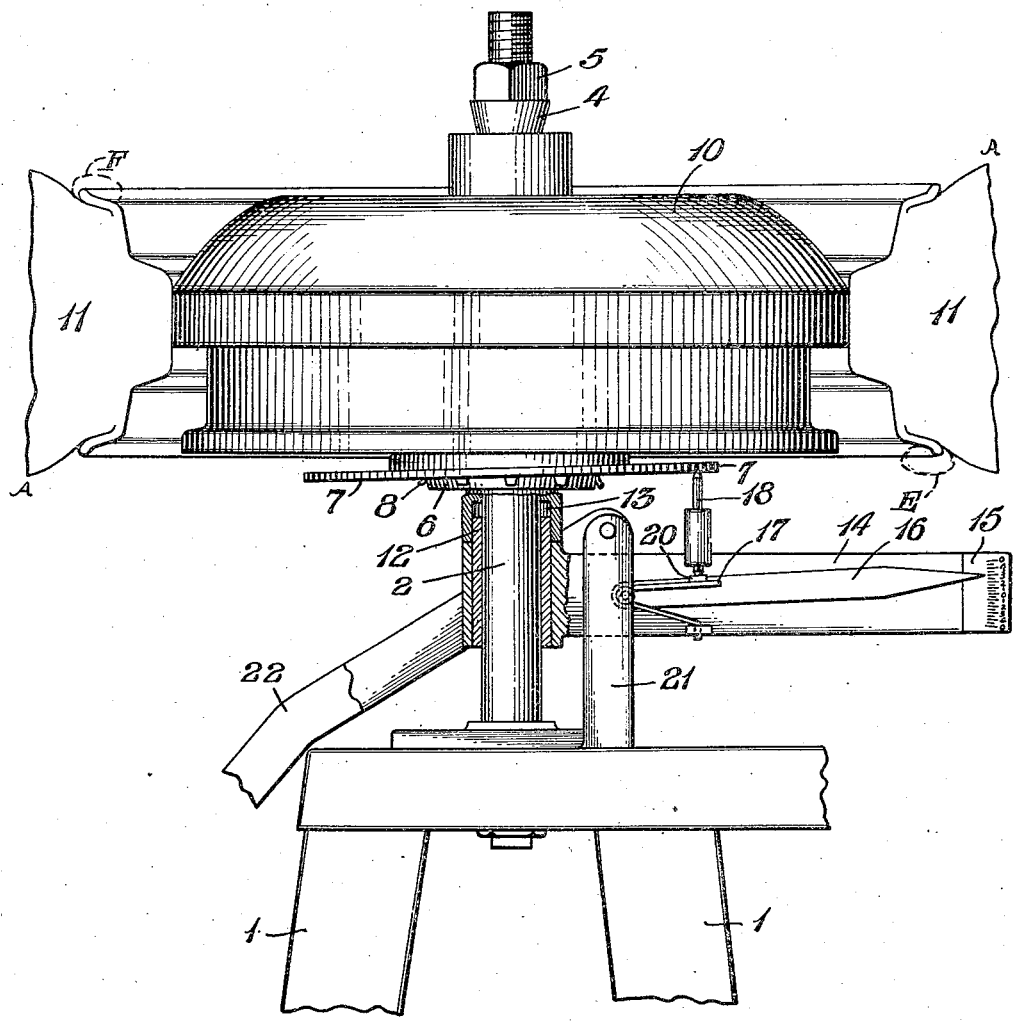
Figure 4 is a side elevation on an enlarged scale with the tire partially cut away, and showing the parts in position to check the amount and location of the dynamic unbalance of the wheel after the detector disc has been adjusted during the wheel spinning operation.

Carried by and extending radially from the sleeve 12 is an arm 14 having a scale 15 on the outer end and a pointer 16 held normally pointing to the upper end of the scale 15 by a spring 17 when the ports are in the position shown in Figure 3. A pin 18 sliding in a bearing 19 rests freely on a ledge 20 carried by the pointer 16, and is adapted to bear against the underside of the plate 7 when the arm 14 is in elevated position as illustrated in Figures 2 and 4, it being observed from Figure 2 that the arrangement is such that the pointer registers with the middle or zero point of the scale when the wobble plate is level.

Mounted in a standard 21 secured to the base 1 is a hand operated lever 22 carrying buttons or rollers 23 which is swingable up into a position where one or the other of the rollers 23 will contact with the under side of the wobble or indicator plate 7 to align it to a predetermined position to a wheel being tested as will be explained in the operative description to follow.

*Operation*

It has been mentioned that wheels are first tested and corrected for static balance before they are tested for dynamic balance.

A wheel to be dynamically balanced is secured to the quill 3 as shown in Figure 3, and by mounting it on its own ball bearings it is placed in exactly the position it will assume in actual operation on an automobile. In other words the axis of the wheel as mounted will be at right angles to the normal plane of rotation.

When the wheel is properly mounted the spinning motor 24 is swung into contact with the rim of the tire by the hand lever 25. This contact spins the wheel at a speed around 800 revolutions per minute which from experiment has been found to be a desirable speed for testing dynamic balance, but other speeds more or less than 800 per minute will also be suitable.

Assuming that the wheel under test is slightly out of dynamic balance, the speed of rotation will cause the wheel to tilt slightly and wobble as it rotates. During this time the motor is disengaged so that the wheel is spinning freely by its own momentum. During this time the indicator arm 14 is left in its low position as shown in Figure 3 and the wobble plate 7 may be in some position close to its normal plane of rotation.

Let it be assumed that the wheel is heavy at the points marked A, A on the tire in Fig. 3. The additional weight at these points will cause the wheel to tilt slightly from its normal plane, as represented by the line B—B, through an angle dependent upon the amount of unbalance to a position indicated by the line C—C. The quill 3 and wobble plate 7 are thereby caused to tilt a like amount, the wobble plate tilting from its initial plane D—D, as indicated in solid lines in Fig. 3, to a new plane E—E, as indicated in dotted lines. As will be apparent, this tilting of the wheel, quill, and wobble plate due to the unbalanced condition of the wheel, causes them to wobble about an axis as they rotate.

The next operation is to raise the lever 22 so that one or both of the friction buttons 23 will contact with the under side of the wobble plate and tilt it back into level position so that it runs true—that is to say, so that it rotates without any wobble. This levelling of the wobble plate takes place through a movement of the wobble plate spherical bearing 7a and the springs 8 sliding on the ball shaped hub member 6, the friction here being sufficient to hold the plate 7 in any adjusted position placed by contact with the buttons 23. The rotation of the wheel is now arrested by means of the brake member 26 carried on the outer end of the hand lever 25 being brought into contact with the rim of the wheel tire.

The sleeve 12 and its associated indicating assembly is now raised by hand and the top of the sleeve entered into the recess 13 which acts to return the wheel to its initial horizontal plane along the line B—B. This position of the parts is illustrated in Fig. 4, wherein it will be seen that due to the above-described levelling of the wobble plate 7 during the wheel spinning operation, the plate will now be inclined with respect to the axis of the quill 3, the amount of the incline being equal to the angle between the lines D—D and E—E, which, as above noted, is the same as the angle between the lines B—B and C—C. It is also to be observed that the direction of incline of the plate is toward the heavy points A, A of the wheel, and such that the high point of the plate is toward that side of the wheel where the heavy point A is on top, and the low point of the plate toward the side of the wheel where the heavy point A is on its lower side.

The parts are now in position to check the degree and position of dynamic unbalance of the wheel, and this is accomplished by slowly rotating the wheel by hand whereupon it will be found that the plate 7, due to its inclination with respect to the axis of the quill 3, will now wobble again although the wheel itself runs true by reason of the quill being fixedly held in vertical position by the sleeve 12. In this position of the sleeve 12, as shown in Fig. 4, it will be observed that the pin 18 will bear against the under side of the wobble plate and will follow the wobble of the plate to move the pointer 16 over the scale 15. It will be understood that the spring 17 is sufficiently light so that the pressure of the pin 18 against the wobble plate is not great enough to overcome the friction between the springs 8 and the hub 6 so as to shift the plate during this operation.

It will be apparent that when the pointer 16 reaches the upper extremity of its movement, it indicates that one of the heavy points of the wheel is directly above the pointer and on the top side of the wheel. The other heavy point of the wheel will obviously be directly opposite and on the under side of the wheel. The scale 15 may be suitably graduated so that the amount of unbalance may readily be determined by the number of graduations traversed by the pointer as it is actuated back and forth by the pin 18 riding on the under side of the wobble plate, and this unbalance may be compensated for by placing suitable weights on the wheel at points opposite the heavy points A, A as indicated at E and F in Figs. 3 and 4.

After placing the weights where indicated it is desirable to repeat the operation of checking the wheel to make certain that the operator has selected the proper size weights and has accurately placed them on the wheel so as to adequately compensate for the unbalanced condition, and if he has not, the size and position of the weights may be altered accordingly, or such additional weights added as may be necessary, until a further test shows the wheel to run true, as will be indicated when the pointer 16 remains stationary at the zero point on the scale 15.

What I claim as new and desire to secure by Letters Patent is:

1. An apparatus for checking the dynamic balance of automobile wheels comprising an upright rotatable arbor, means for mounting a wheel on said arbor for rotation therewith, a hub member on the lower end of said vertical arbor and movable therewith, an indicator plate mounted on said hub member through frictional engagement therewith and capable of movement relative thereto, with means for contacting said indicator plate while under rotation to set it in a plane of rotation having a tilt relative to said wheel equal to the tilt of said wheel from normal when rotating out of dynamic balance, and other means associated with said indicator plate for measuring the amount of its deflection relative to a normal plane of rotation.

2. An apparatus for checking the dynamic balance of automobile wheels and the like comprising a vertical arbor on which a wheel may be mounted for free rotation, an indicator plate mounted on said arbor by frictional engagement and capable of movement relative thereto, means for contacting said plate while under rotation to set it in a plane of rotation having a tilt relative to said wheel equal to the tilt of the wheel from normal when rotating out of dynamic balance, and other means associated with said indicator plate for measuring the amount of its deflection relative to a normal plane of rotation.

3. An apparatus for checking the dynamic balance of automobile wheels and the like comprising a vertical spindle, a quill mounted on said spindle for free rotation, means on said quill for holding an automobile wheel, means also on said quill for supporting an indicator plate through frictional engagement and capable of movement relative thereto and means for contacting said indicator plate while under rotation to set it in a plane of rotation parallel to a plane passing through the path of the center of gravity of the wheel when rotating out of dynamic balance, and other means associated with said indicator plate for measuring the amount of its deflection relative to a normal plane of rotation.

4. An apparatus for testing the dynamic balance of automobile wheels and the like comprising a spindle for supporting an automobile wheel, a quill secured to said wheel through contact with the wheel bearings and having an opening for encompassing said spindle, a wobble plate mounted on said quill and movable therewith and relative thereto, means for contacting said wobble plate while under rotation to set its plane of rotation parallel to a plane passing through the path of the center of gravity of a wheel when rotating out of dynamic balance, and other means associated with said indicator plate for measuring the amount of its deflection relative to a normal plane of rotation.

5. An apparatus for checking the dynamic balance of automobile wheels and the like comprising a fixed vertical support for an automobile wheel for positioning it in a relatively horizontal plane, a rotatable element secured to the wheel and mounted on said support and freely rotatable thereon, means for rotating said wheel at a relatively high speed and then releasing it to spin freely, a detector disc mounted on said rotatable element by frictional contact and rotating in unison with said wheel and means for adjusting said detector disc to rotate parallel with the path of the center of gravity of the rotating wheel.

6. An apparatus for checking the dynamic balance of automobile wheels and the like comprising a mounting for a wheel permitting free spinning movement thereon and means to spin the wheel, a member adjacent the wheel and movable in unison therewith, means for contacting said member to adjust its plane of rotation relative to the wheel, separate means for then contacting said member and a pointer controlled thereby moving over a scale to give a visual reading of the amount of difference between the normal plane of rotation of the wheel and the adjusted member.

7. An apparatus for checking the dynamic balance of automobile wheels and the like comprising a mounting for a wheel, means for freely spinning said wheel on said mounting, a wobble plate mounted adjacent said wheel and spinning in unison therewith, means for contacting said wobble plate and adjusting its plane of rotation relative to said wheel, other means for then contacting said wobble plate comprising a pointer and scale for giving visual evidence of the difference in its plane of rotation relative to the normal plane of rotation of said wheel.

8. An apparatus for checking the dynamic balance of automobile wheels and the like comprising a mounting for an automobile wheel having rotative movement, a wobble plate mounted by frictional contact adjacent said wheel and movable in unison therewith, means for contacting said wobble plate and adjusting its plane for rotation parallel to the path of the center of gravity of said wheel when both are rotating, other means for then contacting said wobble plate to give a visual reading of the difference in its plane of rotation relative to the wheel when the wheel is rotating in a substantially horizontal plane.

9. An apparatus for checking the dynamic balance of automobile wheels and the like comprising a mounting for an automobile wheel permitting rotation of the wheel and mounting, a wobble plate frictionally engaging said mounting and movable therewith, means for fixing the plane of rotation of said wobble plate relative to said wheel when both are under rotation, and means for then engaging said wobble plate to indicate the difference between the plane of rotation of the wobble plate and the plane of rotation of the wheel positioned to rotate in a substantially horizontal plane.

10. An apparatus for checking the dynamic balance of automobile wheels and the like comprising a rotatable mounting for a wheel, an indicator member frictionally engaging said mounting and rotatable therewith, means for adjusting the plane of rotation of said indicator member relative to a wheel when both are under rotation, the adjustment placing the indicator member parallel to a plane passing through the path of the center of gravity of the wheel and means for then contacting the indicator member to indicate the difference between the plane of rotation of the indicator member and the normal plane of rotation of the wheel.

11. An apparatus for checking the dynamic balance of automobile wheels and the like comprising a vertical support, a quill for carrying a wheel and mounted for rotation on said support, an indicator member frictionally mounted on said quill and rotatable therewith, means for moving said indicator member relative to said quill so that its plane of rotation will be parallel with a plane passing through the path of the center of gravity of a wheel freely rotating out of dynamic balance and means for indicating the difference between the plane of rotation of the indicator member and the normal plane of rotation of the wheel.

12. An apparatus for checking the dynamic balance of automobile wheels and the like comprising a fixed support, a quill mounted on said support for rotation, an indicator member frictionally mounted on said quill to rotate in unison therewith and to assume positions out of axial alignment therewith, means for moving said indicator member relative to said quill so that its plane of rotation will be parallel with a plane passing through the path of the center of gravity of a wheel rotating out of dynamic balance and means for then indicating the difference between the plane of rotation of the indicator member and the plane of rotation of the wheel when rotating in a plane of dynamic balance.

13. An apparatus for checking the dynamic balance of automobile wheels and the like comprising a fixed support, a quill mounted on said tion on said support, an indicator member frictionally mounted on said quill to rotate in unison therewith and to assume different planes of rotation relative thereto, means for placing said indicator member in planes of rotation passing through the path of the center of gravity of a wheel when running out of dynamic balance, means for then positioning the wheel to rotate in a true horizontal plane so that the previously positioned indicator member will give visual evidence of the difference between the plane of rotation of the wheel in the horizontal position and the plane of rotation when running out of dynamic balance.

14. An apparatus for checking the dynamic balance of automobile wheels and the like comprising a support, a mounting on said support for carrying a wheel, an indicator member carried by said wheel mounting and frictionally engaging therewith to rotate in unison therewith and to assume different planes of rotation relative thereto, means for placing said indicator member in planes of rotation passing through the path of the center of gravity of a wheel running out of dynamic balance, means for then positioning a wheel in a true horizontal plane for rotation, the previously positioned indicator member then giving visual evidence of the difference between the plane of rotation of the wheel in the horizontal position and the plane of rotation of the wheel when running out of dynamic balance.

15. An apparatus for checking the dynamic balance of wheels and the like comprising a fixed vertical spindle, a support for a wheel so mounted on said spindle that it may rotate relative thereto and assume an angular relation therewith, an indicator member mounted on said support for tilting movement relative to said support and to a wheel mounted thereon and for rotation in unison with said wheel and support, means for imparting a free spinning rotation to said wheel, support and indicator member whereby the wheel may wobble in response to any unbalance thereof, means for then contacting the indicator member to set its plane of rotation parallel with the path of the center of gravity of the spinning wheel, and means for then supporting the wheel to rotate in a true horizontal plane so that the positioned indicator member will show the difference between the horizontal plane and the position assumed by the wheel when freely spinning.

16. An apparatus for checking the dynamic balance of wheels and like comprising a spindle, a support for a wheel resting on said spindle and capable of rotary as well as oscillatory or wobble movement, an indicator member associated with said wheel and support therefor, means for imparting free spinning rotation to said wheel, support and indicating member whereby the wheel will wobble according to its degree of dynamic unbalance and thus tilt the support on the spindle, means for contacting the indicator member to set its plane of rotation parallel with the path of the center of gravity of the wheel, and means for then rotating the wheel in a horizontal plane to cause the indicator member to wobble and show the difference between its plane and a horizontal plane.

17. An apparatus for checking the dynamic balance of wheels and the like comprising a vertical spindle, a quill encompassing said spindle and having a hub member on the lower end and a wheel support on the upper end, the quill being capable of rotary as well as angular movement relative to the spindle, means for securing a wheel to the support with its normal plane at right angles thereto, an indicator member mounted on said hub member for tilting movement relative to said quill and to a wheel mounted thereon, and for rotation in unison with said wheel and quill, means for imparting free spinning movement to said wheel, quill and indicator member to cause said wheel to wobble according to its degree of dynamic unbalance, means, while the wheel, quill and indicator member are freely spinning, to contact with said indicator member and set its plane of rotation parallel with the normal plane of said wheel, means for holding the said wheel in a true horizontal plane whereby the tilt of the indicator member will indicate the degree of dynamic unbalance present in the wheel as well as indicate the light and heavy side of the wheel.

18. An apparatus for checking the dynamic balance of wheels and the like comprising a rotatable support for a wheel, a mounting for said support permitting angular movement relative to said mounting, an indicator member associated with said support for tilting movement relative to said support and to a wheel mounted thereon, and for rotation in unison with said wheel and support, means for spinning said wheel, support and indicator member and then releasing them to spin freely so the wheel may wobble in response to any unbalance, means operative while the wheel, support and indicator member are freely spinning for setting the said indicator member to rotate in a plane perpendicular to the axis of wobbling of the wheel, means for positioning the wheel to assume a true horizontal plane and leaving the indicator member in the relative position given it when the wheel support and indicator member were spinning, means for then contacting the said indicator member while rotating the wheel, support and indicator member slowly, said means including a pointer and a scale over which the pointer rides to indicate by the wobble of the indicator member the difference between the true horizontal plane of rotation of the wheel and the position assumed when spinning freely.

19. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, and reference means carried by said support for tilting movement therewith and for angular adjusting movement into a predetermined relation to said axis of wobbling.

20. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, reference means associated with said support for tilting movement therewith and for angular adjusting movement into a predetermined relation to said axis of wobbling, and adjusting means for cooperation with said reference means during movement thereof with said wheel support.

21. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, reference means associated with said support for tilting movement therewith and for angular adjusting movement into a predetermined relation to said axis of wobbling, adjusting means for cooperation with said reference means during movement thereof with said wheel support, and indicating means for cooperation with said reference means to provide an indication of the adjustment thereof relative to said support.

22. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, and means carried by said support and responsive to wobbling movement thereof for locating the unbalance in the wheel, said last-mentioned means being adjustable to alter the position of its axis with respect to the axis of said support.

23. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, adjustable disc means rotatable with said support, and means cooperatively related to said support and said disc means and responsive to wobbling movement thereof for providing an indication of the unbalance in the wheel.

24. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, an annular reference member surrounding and operatively associated with said support for tilting movement therewith and for angular adjusting movement into a predetermined relation to said axis of wobbling, and means cooperable with said member for adjusting the latter into said predetermined relation.

25. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, an annular reference member surrounding and operatively associated with said support for tilting movement therewith and for angular adjusting movement into a predetermined relation to said axis of wobbling, means cooperable with said member for adjusting the latter into said predetermined relation, and gauge means associated with said member for providing an indication of the amount and location of the unbalance of the wheel.

26. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support about an axis, an annular reference member surrounding and operatively associated with said support for tilting movement therewith and for angular adjusting movement into a predetermined relation to said axis of wobbling, means cooperable with said member for adjusting the latter into said predetermined relation, means for setting said support to a predetermined reference position, and gauge means associated with said member for providing an indication of the amount and location of the unbalance of the wheel.

27. An apparatus for checking the dynamic balance of vehicle wheels and the like, comprising a rotatable wheel support having means for mounting a wheel for movement as a unit therewith and with the wheel axis in alignment with the axis of said support, means mounting said support for universal tilting movement, means for rotating a wheel and said support whereby unbalance of the wheel will cause wobbling of the wheel and the support, an indicator disc carried by said support for rotation therewith, said disc being tiltable with respect to the axis of said support, and means engageable with said disc during rotation thereof to tilt said disc relative to said support in accordance with the degree of wobbling movement of said wheel.

HERBERT GLENN HOLMES.

CERTIFICATE OF CORRECTION.

Patent No. 2,211,779. August 20, 1940.

HERBERT GLENN HOLMES.

It is hereby certified that error appears in the printed specification of the above numbered patent requiring correction as follows: Page 5, first column, lines 17 and 18, claim 13, strike out the words and syllable "on said tion" and insert instead --for rotation--; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.